No. 44,713. PATENTED OCT. 18, 1864.
L. M. DOUDNA.
LOADING ATTACHMENT FOR HAY WAGONS

2 SHEETS—SHEET 1.

Witnesses.
Henry Morris
C. L. Toftiff

Inventor:
L. M. Doudna
per Munn & Co.
Attorneys

No. 44,713. PATENTED OCT. 18. 1864.
L. M. DOUDNA.
LOADING ATTACHMENT FOR HAY WAGONS.

2 SHEETS—SHEET 2.

UNITED STATES PATENT OFFICE.

L. M. DOUDNA, OF ELMIRA, NEW YORK.

IMPROVEMENT IN LOADING ATTACHMENTS TO HAY-WAGONS.

Specification forming part of Letters Patent No. 44,713, dated October 18, 1864.

*To all whom it may concern:*

Be it known that I, L. M. DOUDNA, of Elmira, in the county of Chemung and State of New York, have invented a new and Improved Loading Device; and I do hereby declare that the following is a full, clear, and exact description thereof, which will enable others skilled in the art to make and use the same, reference being had to the accompanying drawings, forming part of this specification, in which—

Figure 1:
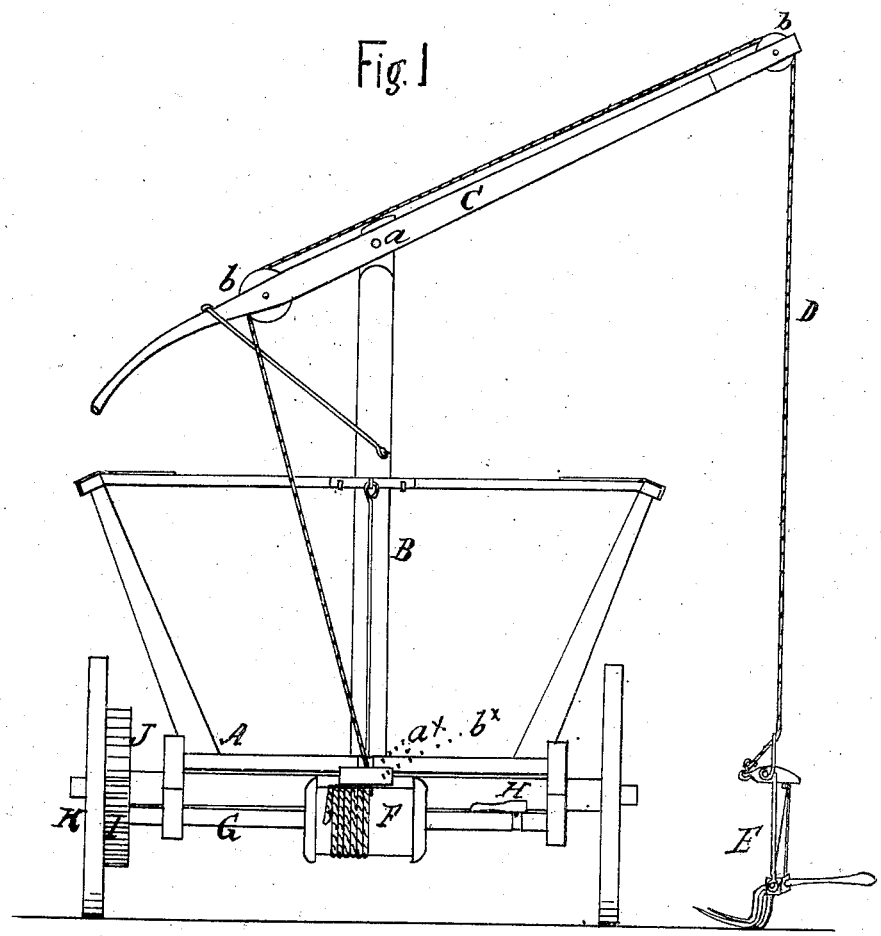
Figure 2:
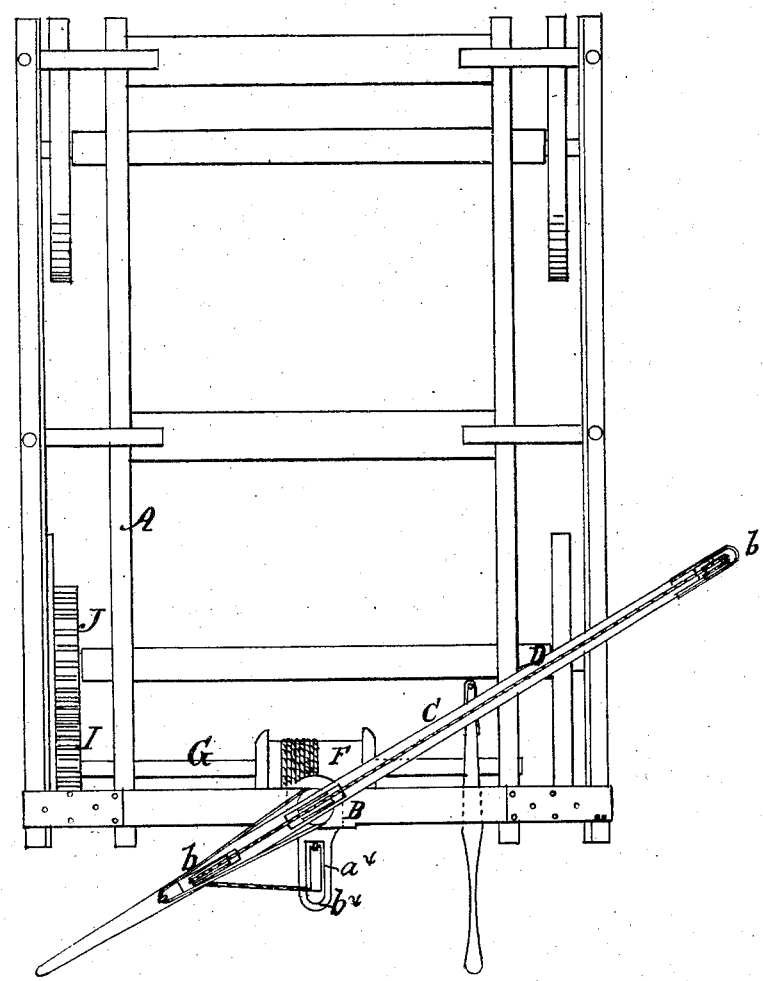

Figure 1 is a rear view of a wagon with my invention applied to it; Fig. 2, a plan or top view of the same.

Similar letters of reference indicate like parts.

This invention relates to a new and improved loading attachment to be applied to wagons, and arranged in such a manner that the wagon may be loaded as it is drawn along in the field.

The invention is designed for loading wagons with hay, grain, fruit, potatoes, &c., gathered in cocks or piles at convenient distances apart in the field.

A represents a wagon, which may be constructed in any proper manner, and having a standard, B, at the rear part of its body, said standard being arranged in such a manner that it may turn freely in its bearings. On the top of this standard B there is secured by a pivot, $a$, a lever, C, having two pulleys, $b\ b$, fitted in it, over which a rope, D, passes, one end of said rope having a fork, E, attached to it, and the other end being fastened to a drum, F, on a shaft, G, which is at the rear of the wagon, behind the back axle. The shaft G is allowed to slide in its bearings, and it is moved or adjusted by a lever, H. One end of this shaft has a pinion, I, upon it, which gears into a wheel, J, attached concentrically to one of the back wheels K of the wagon, and the pinion I is shoved in or out of gear with the wheel J by moving the shaft G.

The operation in loading hay, for instance, is as follows: The hay is previously gathered into cocks, and the wagon is drawn past them, the operator having hold of the lever H keeping the pinion I out of gear with the wheel J while the wagon is being drawn from cock to cock. As the wagon reaches a cock the fork E is thrust into it and the pinion I of shaft G thrown in gear with the wheel J. This causes the shaft G to rotate as the wagon is drawn along, and the rope D will be wound upon the drum F, and the fork E, with its load, elevated, the load being swung over the wagon by turning the lever C, and the fork is tripped in order to discharge its load. The pinion I is then thrown out of gear with the wheel J and the fork. The lever C, being previously swung around from over the wagon, descends so as to take up a succeeding load.

When potatoes or fruit are to be loaded a basket or bucket is used instead of the fork E.

I would remark that a guide-pulley, $a^x$, is fitted in an arm, $b^x$, at the rear of the wagon for the rope D to pass over in winding upon and off from the drum F.

I claim as new and desire to secure by Letters Patent—

The rotating standard B, provided with the lever C, and placed at the rear of the wagon A, in combination with the hoisting-rope D and drum F, the latter being on an adjustable shaft G at the rear of the wagon, and connected with and disconnected from one of the wheels K of the wagon, as shown, and all arranged substantially as and for the purpose set forth.

L. M. DOUDNA.

Witnesses:
R. H. RANSOM,
W. SCHLEICHER.